United States Patent [19]

Bergman

[11] Patent Number: 5,115,497
[45] Date of Patent: May 19, 1992

[54] OPTICALLY INTRACONNECTED COMPUTER EMPLOYING DYNAMICALLY RECONFIGURABLE HOLOGRAPHIC OPTICAL ELEMENT

[75] Inventor: Larry A. Bergman, Van Nuys, Calif.

[73] Assignee: California Institute of Technology, Pasadena, Calif.

[21] Appl. No.: 103,192

[22] Filed: Oct. 1, 1987

[51] Int. Cl.⁵ .............................................. G06F 9/00
[52] U.S. Cl. ............................. 395/375; 364/DIG. 1; 364/232.2; 364/261; 364/261.1; 364/263.1; 364/262.4; 364/262.9; 364/264
[58] Field of Search ... 364/200 MS File, 900 MS File, 364/736, 741

[56] References Cited

U.S. PATENT DOCUMENTS

| | | | |
|---|---|---|---|
| 3,916,383 | 10/1975 | Malcolm | 364/200 |
| 4,136,383 | 1/1979 | Takesue | 364/200 |
| 4,172,281 | 10/1979 | Gordon | 364/200 |
| 4,332,008 | 5/1982 | Shima et al. | 364/200 |
| 4,342,082 | 7/1982 | Brown et al. | 364/200 |
| 4,384,324 | 5/1983 | Kim et al. | 364/200 |
| 4,395,758 | 7/1983 | Helenius et al. | 364/200 |
| 4,454,578 | 6/1984 | Matsumoto et al. | 364/200 |
| 4,641,275 | 2/1987 | Hatakeyama et al. | 364/900 |
| 4,705,344 | 11/1987 | Hinton et al. | 350/3.73 |
| 4,811,210 | 3/1989 | McAulay | 364/200 |
| 4,831,519 | 5/1989 | Morton | 364/200 |
| 4,859,012 | 8/1989 | Cohn | 350/96.24 |

OTHER PUBLICATIONS

Wu, W. H. et al., "Implementation of Optical Interconnections for VLSI", *IEEE Transactions on Electron Devices*, vol ED-34, No. 3, Mar. 1987, pp. 706-126.
Bergman, L. A. et al., "Holographic Optical Interconnects For VLSI", *Optical Engineering*, vol. 25, No. 10, Oct. 1986, pp. 1109-1118.

*Primary Examiner*—Kevin A. Kriess
*Attorney, Agent, or Firm*—Edward O. Ansell

[57] ABSTRACT

An optically intraconnected computer and a reconfigurable holographic optical element employed therein. The basic computer comprises a memory for holding a sequence of instructions to be executed; logic for accessing the instructions in sequence; logic for determining for each the instruction the function to be performed and the effective address thereof; a plurality of individual elements on a common support substrate optimized to perform certain logical sequences employed in executing the instructions; and, element selection logic connected to the logic determining the function to be performed for each the instruction for determining the class of each function and for causing the instruction to be executed by those the elements which perform those associated the logical sequences affecting the instruction execution in an optimum manner. In the optically intraconnected version, the element selection logic is adapted for transmitting and switching signals to the elements optically.

35 Claims, 4 Drawing Sheets

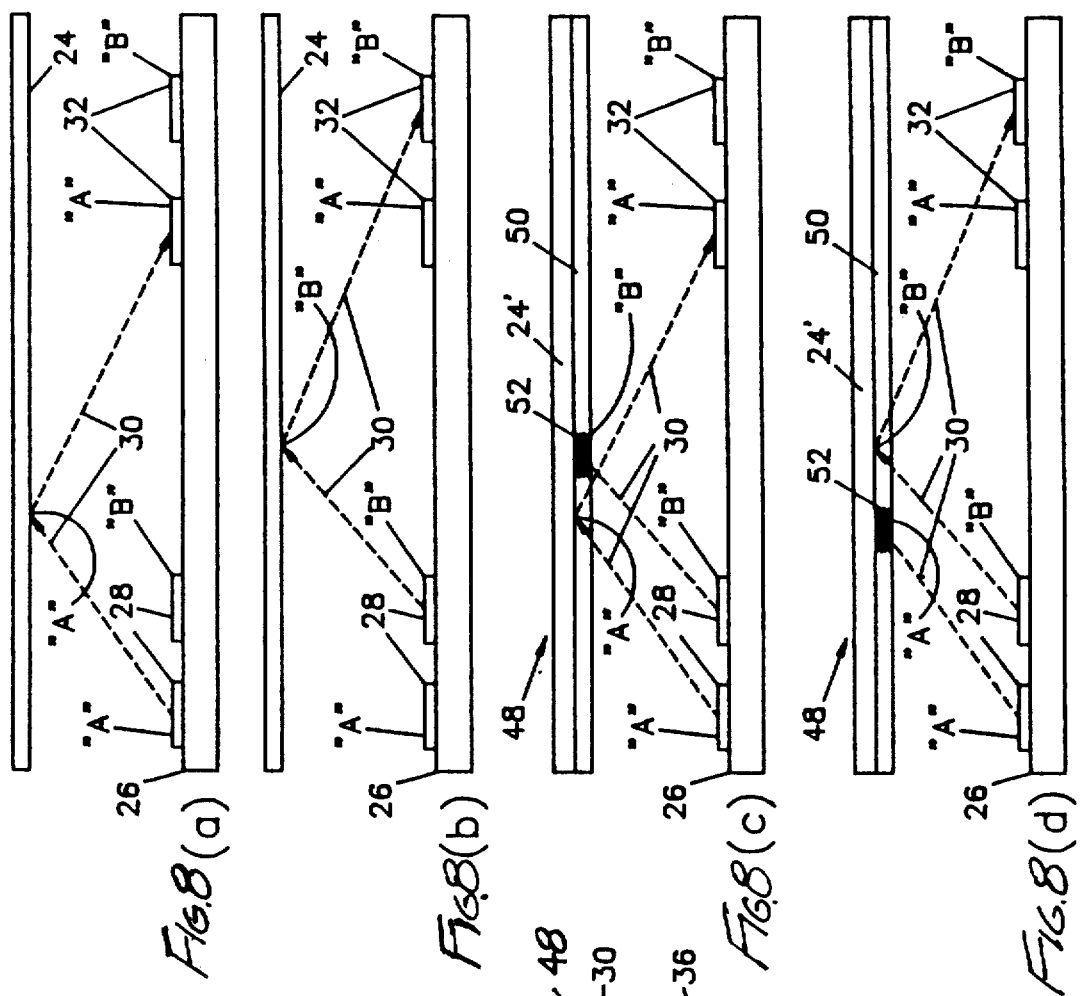
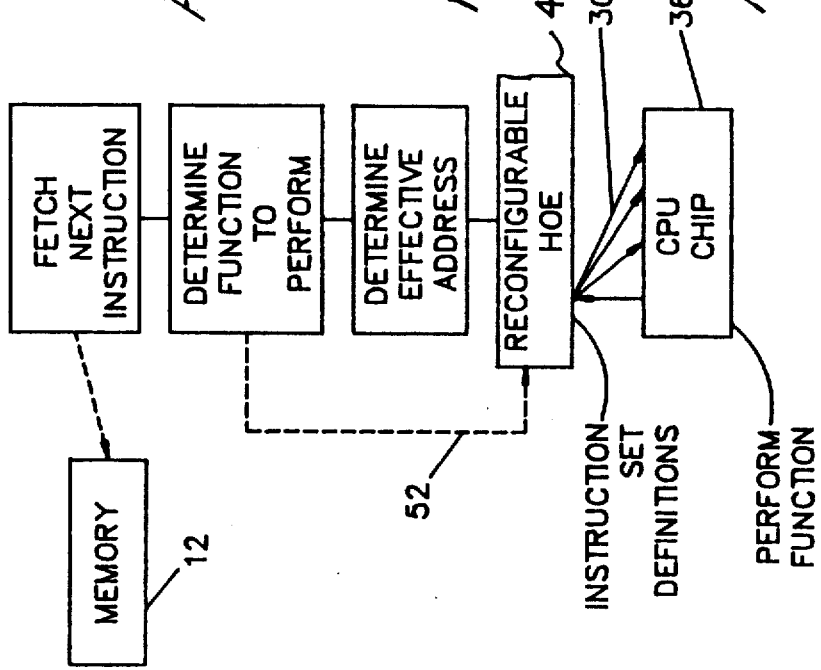

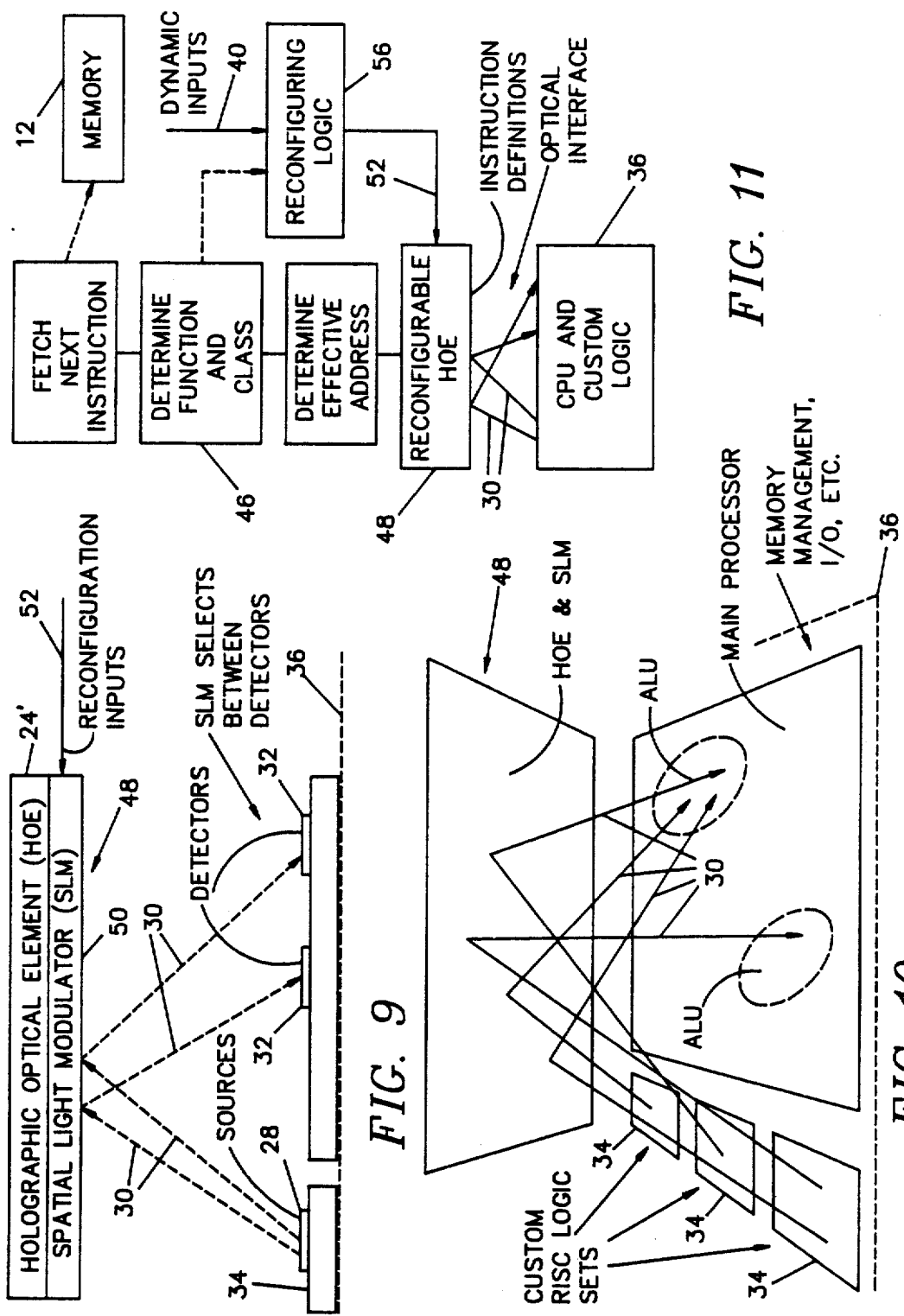

OPTICALLY INTRACONNECTED COMPUTER EMPLOYING DYNAMICALLY RECONFIGURABLE HOLOGRAPHIC OPTICAL ELEMENT

ORIGIN OF THE INVENTION

The invention described herein was made in the performance of work under a NASA contract, and is subject to the provisions of Public Law 96-517 (35 USC 202) in which the Contractor has elected to retain title.

BACKGROUND OF THE INVENTION

The present invention relates to digital computer architectures and internal communications thereof and, more particularly, to an optically intraconnected computer comprising, a memory for holding a sequence of instructions to be executed; logic for accessing the instructions in sequence; logic for determining for each instruction the function to be performed and the effective address thereof; a plurality of individual elements on a common support substrate optimized to perform certain logical sequences employed in executing the instructions; and, element selection logic connected to the logic determining the function to be performed for each instruction for determining the class of each function and for causing the instruction to be executed by those elements which perform the associated logical sequences affecting the instruction execution in an optimum manner; wherein, the element selection logic includes means for transmitting and switching signals to the elements optically comprising, a holographic optical element including a holographic reflective surface mounted adjacent and parallel to the common support substrate; a plurality of light source means carried by the common support substrate for directing signal-modified light beams towards the holographic reflective surface to be reflected thereby back towards the common support substrate; and, a plurality of light detecting means carried by the common support substrate and operably connected to respective ones of the elements to provide electrical signals thereto for detecting selected ones of the light beams as reflected by the holographic reflective surface and providing associated electrical signals derived from the reflected light beams.

In its simplest description, a digital computer is a device which executes a series of instructions relative to a set of data to accomplish a result. A very basic prior art digital computer is generally indicated as 10 in FIG. 1. The computer 10 has a memory 12 containing instructions and data and an arithmetic and logic unit (ALU) 14 connected to a clock 16. The ALU 14 includes registers and logic to repetitively perform the functions shown in FIG. 2. As part of performing its computing functions, the ALU 14 can read from and write to the memory 12 on an individually addressable basis; that is, the memory 12 comprises a matrix of individually addressable locations containing binary (digital) information which can be employed as either an instruction or a piece of data by the ALU 14. The operation of the ALU 14 and its accesses to the memory 12 are controlled by the clock 16 in that the pulses of the clock 16 determine the points in time when the functional elements of the ALU 14 can perform and the memory 12 can be read from and written to.

As depicted by FIG. 2, the ALU 14 sequentially fetches the next instruction to be executed from the memory 12. The instruction is then inspected to determine the function to be performed (i.e. add, multiply, etc.) and the effective address of the data (i.e. one of the registers, a location in memory 12, etc.). The ALU 14 then performs the indicated function employing pre-established hardware instruction performance logic 18.

As can be appreciated, the design and construction of a "new" digital computer operating as above was a time consuming task. As vacuum tubes gave way to discrete component transistors, and the like, and then to integrated circuits; and, as the evolutionary period between new integrated circuits and the technology of producing them became less and less, the designing and implementing of the pre-established hardware instruction performance logic 18 as described above became more and more impractical. Microprocessor design traditionally involves much combinational (random) custom logic in the layout of the ALU. In such an implementation, the basic instruction set of the central processing unit (CPU) which executes the CPU's instruction set is embedded in difficult-to-modify logic which is not programmable, being embodied in immutable hardware. This approach suffers from unpredictable logic errors, delays caused by the impedance of the conductors, and requires excessive space on the CPU's chip. Thus, the instruction execution rate—and the clock speed—are degraded significantly from that attainable by the CPU.

Attempts to make programmable instruction sets have resulted in the development of micro-coded CPUs operating as depicted in FIG. 3. Whereas the basic instructional fetching and evaluation procedure of prior computers is retained, a micro-coded CPU's hardware-implemented instructions are minimized to a set of "standard" operations which can be performed in various combinations to accomplish more complex "instructions". The instruction definitions are embodied in sequences of "micro-code" instructions or firmware 20 typically contained in erasable programmable read only memory (EPROM) 22. The EPROM memory 22 may be erased by flooding with ultraviolet light, or electrically (EEPROMS). This family of machines is easily modified, but also suffers similar speed degradation. Moreover, while "easily" modifiable to a new configuration, such modification is a bench top undertaking and is not adaptable to on-line and/or real-time reconfiguration.

In one approach to the residual problems of micro-coded computers, reduced instruction set computers (RISC) have been designed. They are compact and fast, but can only be customized for a limited group of operations.

STATEMENT OF THE INVENTION

This invention provides a new computer architecture family which is fast, compact, easily reconfigurable, and, in some cases, even dynamically reconfigurable as to its performed instruction definitions.

The foregoing is accomplished in a computer including a memory for holding a sequence of instructions to be executed, logic for accessing the instructions in sequence, logic for determining for each instruction the function to be performed and the effective address thereof, and logic for executing each instruction, by the improvement of the present invention comprising, the logic for executing instructions comprising a plurality of individual elements on a common support substrate optimized to perform certain logical sequences employed in executing instructions; and, element selection logic connected to the logic determining the function to be performed for each instruction for determining the class of each function and for causing the instruction to be executed by those elements which perform the associated logical sequences affecting the instruction execution in an optimum manner.

In the preferred embodiment, the element selection logic includes means for accepting dynamic inputs designating changes in the operating environment of the computer and means for changing the ones of the elements which execute each instruction whereby instruction execution is affected in an optimum manner for the present dynamic conditions.

Optionally, the elements can comprise individual arithmetic and logic units contained on a single central processor unit chip; or, the elements can comprise individual reduced instruction set computers contained on a single central processor unit chip.

Further in the preferred embodiment, the element selection logic portion for causing the instruction to be executed by the elements which perform those associated logical sequences affecting the instruction execution in an optimum manner includes means for transmitting and switching signals to the elements optically.

The preferred means for transmitting and switching signals to the elements optically comprises, a holographic optical element including a holographic reflective surface mounted adjacent and parallel to the common support substrate; a plurality of light source means carried by the common support substrate for directing signal-modified light beams towards the holographic reflective surface to be reflected thereby back towards the common support substrate; and, a plurality of light detecting means carried by the common support substrate and operably connected to respective ones of the elements to provide electrical signals thereto for detecting selected ones of the light beams as reflected by the holographic reflective surface and providing associated electrical signals derived from the reflected light beams.

In one embodiment, there are means for switching the light source means on and off to determine which ones of the light detecting means received the reflected light beams whereby the sequence of the elements receiving and processing the signals is determined.

In the preferred embodiment, light modulation means are disposed between the light source means and the light detecting means for selectively blocking and passing the light beams whereby the sequence of the elements receiving and processing the signals is determined.

The preferred light modulation means is a novel reconfigurable holographic optical element including a holographic reflective surface mounted adjacent and parallel to the common support substrate and light modulation means disposed adjacent the holographic reflective surface for selectively blocking and passing light beams from reflecting from the holographic reflective surface at individual pixel positions thereof; and, means for switching the light modulation means on and off at the individual pixel positions thereof to determine which ones of the light detecting means receive the reflected light beams whereby the sequence of the elements receiving and processing the signals is determined.

List of Cited References

A device called a holographic optical element (HOE) is incorporated into several of the embodiments of the present invention and forms the heart of the preferred embodiments thereof. The HOE and its use in conjunction with VLSI is described in great detail in the following publications, of which copies are being filed contemporaneously herewith:

1. HOLOGRAPHIC OPTICAL INTERCONNECTS FOR VLSI by L. A. Bergman, et al. as reprinted from "Optical Engineering" 25(10), 1109-1118 (October 1986).
2. IMPLEMENTATION OF OPTICAL INTERCONNECTIONS FOR VLSI by L. A. Bergman, et al. as reprinted from "IEEE Transactions on Electron Devices", Vol. ED-34, No. 3, (March 1987).
3. APPLICATIONS AND DESIGN CONSIDERATIONS FOR OPTICAL INTERCONNECTS IN VLSI by L. A. Bergman, et al. as reprinted from "SPIE", Vol. 625, 117-126 (1986).

Discussion of the Cited References

The HOE device as described in the above-referenced articles is incorporated into various embodiments of the present invention and a novel variation is disclosed herein as part of the present invention. The above-referenced articles do not show or suggest the use of a HOE as in the present invention or the novel variation of a HOE (i.e. a dynamically reconfigurable HOE) as is part of this invention.

BRIEF DESCRIPTION OF THE DRAWINGS

FIG. 7 is a semi-functional block diagram of a computer architecture according to the present invention in a semi-preferred embodiment thereof employing a reconfigurable HOE of the present invention therein.

FIGS. 8(a)-8(d) are simplified side views of a HOE being used to transmit signals from one part of an adjacent computer chip to another part of the chip optically in the manner of FIG. 4 and showing the difference in the passive operation of a prior art HOE and active operation of a dynamically reconfigurable HOE according to the present invention.

FIG. 9 is a simplified side view in the manner of FIGS. 4 and 8 of the dynamically reconfigurable HOE of the present invention being used to control the transmission of signals from one part of an adjacent computer chip to another part of the chip optically.

FIG. 10 is a perspective representation of the manner of operation of the reconfigurable HOE of the present invention as shown in FIG. 9.

FIG. 11 is a semi-functional block diagram of a computer architecture according to the present invention in its preferred embodiment employing a reconfigurable HOE of the present invention therein responding to both internal and external influences in the dynamic reconfiguration of the HOE.

DETAILED DESCRIPTION OF THE INVENTION

Figure 4:
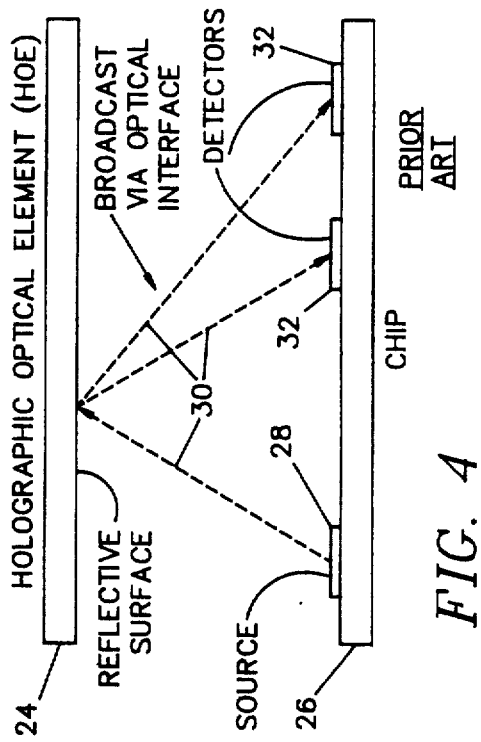
FIG. 4 is a simplified side view of a HOE being used to broadcast signals from one part of an adjacent computer chip to other parts of the chip optically.
Figure 1:
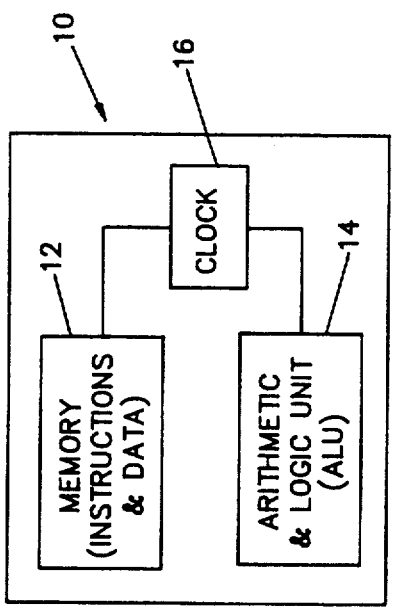
FIG. 1 is a simplified block diagram of a basic prior art computer architecture.
Figure 3:
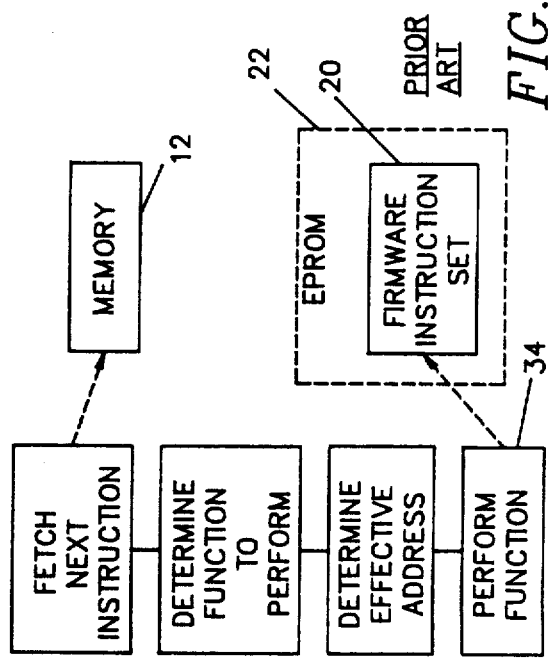
FIG. 3 is a functional block diagram of the operation of another prior art computer architecture of the microcode executing variety.

Prior to an actual description of the various computer architectures which form the family of the present invention, brief mention should be made of the HOE device employed therein. While those interested can get detailed information about HOEs and their use from the above-referenced articles, the aspects thereof of particular interest to the present invention are shown in simplified form in FIG. 4. Basically, the HOE 24 can be thought of as an optical switching surface. The chip 26 and HOE 24 are physically juxtaposed in parallel spaced relationship to one another. The chip 26 contains one or more sources 28 of a laser beam 30 which is directed towards the surface of the HOE 24. The laser beam(s) 30 are reflected by the holographic surface of the HOE 24 back towards the chip 26 to be detected by one or more optical detectors 32 wherein an electrical signal is created for further use by the logic of the chip 26. Thus, signal transmissions can be made at light speed without the delays, and the like, associated with electrically conductive paths. Moreover "broadcast" transmissions can be made to multiple points simultaneously and the problems of complex interconnection layout between points on the chip 26 are eliminated. Again, this procedure and the physiology required therefor are described in detail in the above-listed documents provided herewith.

Figure 2:
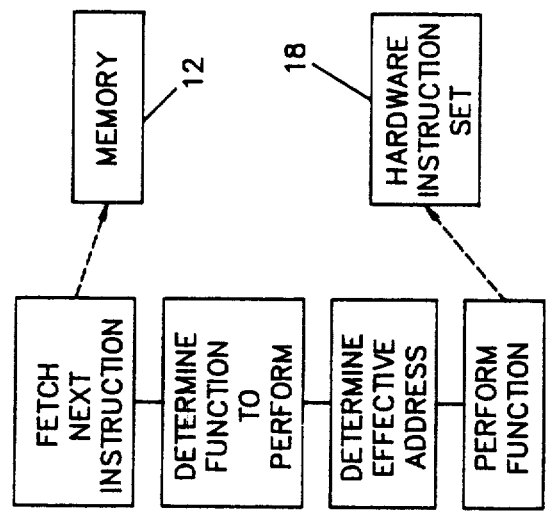
FIG. 2 is a functional block diagram of the operation of the computer architecture of FIG. 1.
Figures 5, 6:
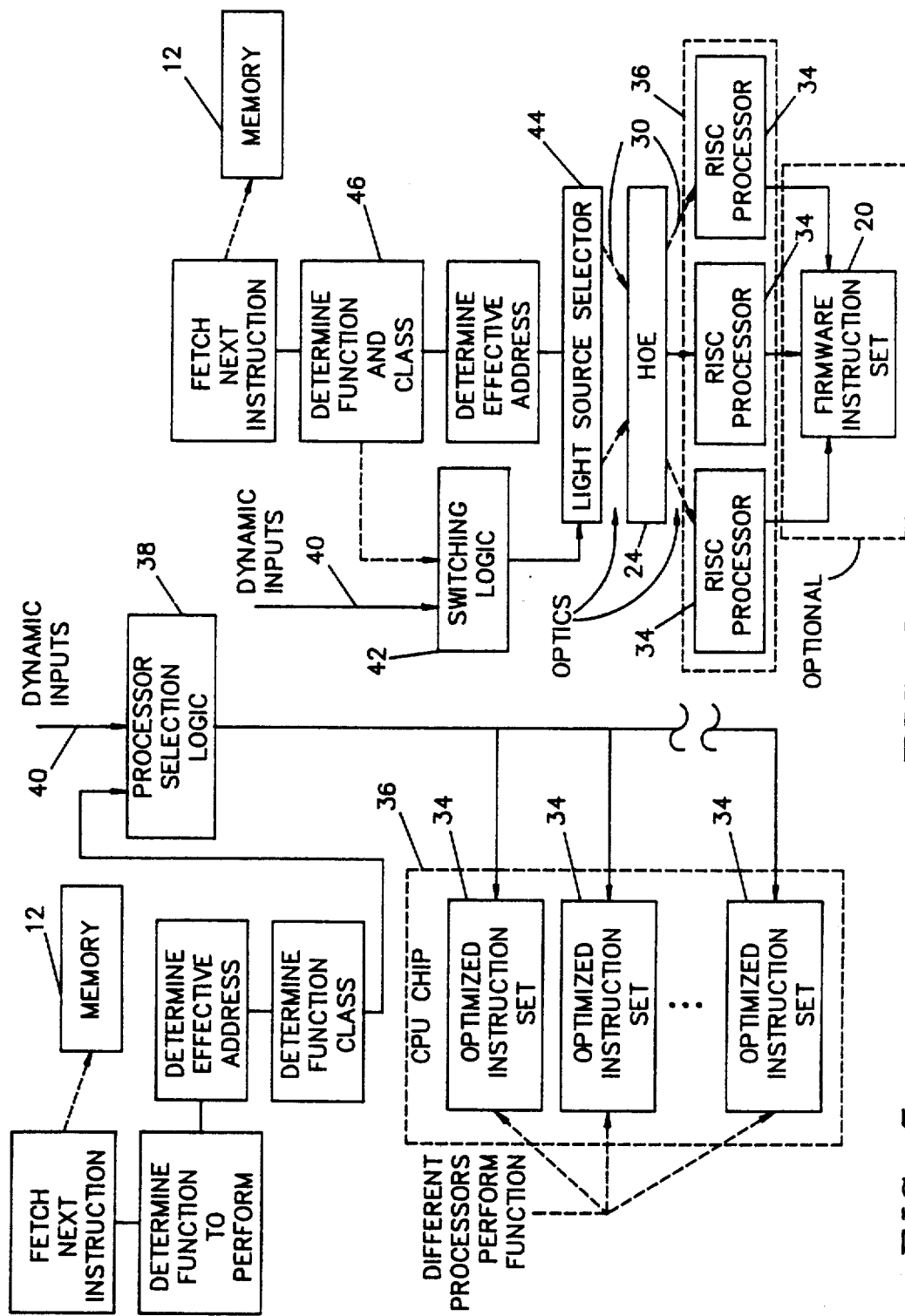
FIG. 5 is a semi-functional block diagram of a computer architecture according to the present invention in a basic embodiment thereof not employing a HOE therein.
FIG. 6 is a semi-functional block diagram of a computer architecture according to the present invention in a basic embodiment thereof employing a prior art HOE therein.

Turning now to FIG. 5, a basic implementation of the present invention is shown in simplified form. In essence, the computer of FIG. 5 operates in the manner of the prior art computer of FIG. 2; that is, the function performance is accomplished by hardware instruction logic. In this embodiment of the present invention, however, the hardware instruction logic is contained in individualized RISC processors 34 contained on the CPU chip 36. Each of the RISC processors 34 is configured to perform an optimized instruction set. When the next instruction to perform has been fetched from memory 12, its function class is determined and input to processor selection logic 38, which determines which of the RISC processors 34 is best suited (i.e. specifically designed) to perform that function. In the preferred embodiment, the processor selection logic 38 also responds to dynamic inputs at 40 whereby the selection of the RISC processor(s) 34 can be modified as a function of changing dynamic conditions. It should be noted in this regard that the embodiment of FIG. 5 is different from a multi-processor computer architecture wherein functional sequences of instructions or "programs" are assigned to different ones of interconnected computers (CPUs) for execution. In this embodiment of the present invention, the execution of each instruction in sequence is selectably and switchably accomplished by an appropriate RISC processor 34 contained within a single CPU 36.

The functional operation of another embodiment of the present invention is shown in FIG. 6 wherein multiple RISC processors 34 are again employed and a HOE 24 is employed in its switching capacity to cause performance, in each case, through an optical interface by the RISC processor 34 best suited to the circumstances at the time. The HOE 24 is controlled by the switching logic 42 which controls which of the laser beams 30 from the light source selector 44 are directed to the reflecting surface of the HOE 24 to be reflected thereby to the desired RISC processor 34. The switching logic 42 is, in turn, basically controlled by the logic at 46 which determines the function to perform and its functional class; but, preferably, can be controlled as well by dynamic inputs 42 responding to changed conditions as in the prior embodiment. Both this embodiment and the prior embodiment of FIG. 5 can be totally hardware oriented; or, if desired, either embodiment can be operated as a microcoded computer by having the RISC processors access microcode firmware 20 as depicted in FIG. 6.

In the semi-preferred embodiment of the present invention shown in the functional block diagram of FIG. 7, the firmware/semi-software instruction sets of the prior embodiments are eliminated along with their physical interconnections and the problems associated therewith. The "micro-code" is embodied within the holographic surface of the reconfigurable HOE 48 and is "executed" by sequentially directing the laser beam containing the execution data from one area of the juxtaposed CPU chip 36 to another.

Before continuing to the preferred embodiment of the present invention, it is necessary to digress briefly to the drawings of FIGS. 8-10 wherein a novel dynamically reconfigurable HOE 48, as is part of the present invention and necessary thereto, is shown and distinguished over the basic HOE 24 in simplified form. The reconfigurable HOE 48 comprises a basic HOE 24' having a spatial light modulator (SLM) 50 disposed over (or as part of) the holographic reflective surface of the HOE 24' facing the chip 26'. The spatial light modulator 50 (or light valve) is a device presently known in the art by which each pixel position of a two-dimensional matrix can be individually modified as to its light passage qualities through electrical, magnetic, or other, means. A common example of such devices is familiar from so-called "liquid crystal" displays as employed in wristwatches, and the like. As with the HOE itself, the spatial light modulator art is a dynamic art changing and improving daily and those interested in the specifics of the latest developments in that art are directed to the literature generally available. In the interest of simplicity and the avoidance of redundancy, details of spatial light modulators and their operation will be omitted herein. It is sufficient to say for purposes of the present invention that, either as a replacement for or in addition to the holographic surface of the HOE 24', the dynamically changable SLM 50 can be changed under the control of reconfiguration inputs at 52 to, in turn, change the switching sequence of the HOE 24'. It should also be noted that while the spatial light modulation takes place on or directly adjacent to the holographic reflective surface of the HOE in the example depicted and described herein, as those skilled in the art will recognize and appreciate, the SLM could be interposed in the path of the light beam at a distance and its operation affected through the use of focusing optics well known in the art. While not preferred, a device operating as what could be referred to as a transmitting HOE (i.e. a form of pixel-oriented, matrix, spatial light modulator), as is known in the art, could also be employed in place of a reflective HOE. Also, the reflective surface of the HOE could comprise a plurality of reflective angles instead of a holographic surface, per se, within the scope and spirit of the present invention.

The difference in operation between a prior art HOE 24 as employed in the present invention in the embodiment of FIG. 6 and the novel reconfigurable HOE 48 employed in the preferred embodiments can be understood best with reference to FIGS. 8(a) through 8(d). FIGS. 8(a) and 8(b) show the operation of a standard HOE 24. To communicate with detector "A", the laser beam 30 from laser source "A" is turned on and reflected from the holographic reflective surface of the HOE 24 at point "A" as depicted in FIG. 8(a). To communicate with detector "B", on the other hand, the laser beam 30 from laser source "B" is turned on and reflected from the holographic reflective surface of the HOE 24 at point "B" as depicted in FIG. 8(b). Thus, since the HOE 24 is a passive device, switching through its use can only be accomplished through the control of the source(s) 28 of the laser beam(s) 30.

By contrast, as depicted in FIGS. 8(c) and 8(d), the reconfigurable HOE 48 is a dynamic or active device. Multiple laser beams 30 from multiple sources 28 can be directed at the reflective holographic surface of the HOE 24' continually. Switching is accomplished by controlling the light passing qualities of the pixel positions of the SLM 50. For example, as shown in FIG. 8(c), To communicate with detector "A", the laser beam 30 from laser source "A" is allowed to reflect from the holographic reflective surface of the HOE 24 at point "A" while the pixel 54 of the SLM 48 at point "B" is darkened to prevent the laser beam 30 from source "B" to pass through and be reflected. To communicate with detector "B", on the other hand, the pixels 54 are reversed so that the laser beam 30 from laser source "B" is reflected from the holographic reflective surface of the HOE 24 at point "B" and the laser beam 30 from laser source "A" is blocked, as depicted in FIG. 8(d).

Turning now to FIG. 11 in combination with FIG. 10, the preferred embodiment of the present invention will now be described functionally. In this embodiment, the instruction sets are physically removed from the CPU and instructions are to one or more ALUs (as appropriate) via light signals, with input and output signals routed point-to-point by the reconfigurable HOE 48 under the control of the reconfiguration logic 56 with inputs from the logic determining the function and class 46 as well as dynamic inputs 40. The light signals are preferably generated by laser diodes and received by photodiodes as described in the above-referenced literature. Functionally, this embodiment may be envisioned as several RISC designs overlaid on a common VLSI substrate with each RISC being designed specifically for a specific operation such as Boolean operations, control, convolution, and the like in the manner previously described with respect to FIGS. 5–7. Each subset of instructions is mapped onto one of the ALUs by the HOE 50, the specific subset desired being switched by turning on one set of laser diodes while switching off all the other sets, and/or by electronically selecting signals to be sent via a single set of laser diodes, etc. Thus, instruction set changes may be made fairly rapidly. In basic form, the foregoing description also applies to the embodiment of FIG. 7 as previously discussed. In this embodiment, however, in addition to having multiple ALUs on the CPU portion of the chip so as to take advantage of specialized "hardware" capabilities in each case as appropriate, the HOE 48 itself is dynamically reprogramable by the reconfiguration logic 56 in response to dynamic inputs at 40. As a result, changes can be made very rapidly; in fact, it is contemplated that, possibly, changes will be able to be affected at clock speed.

I claim:

1. In a computer including a memory for holding a sequence of instructions to be executed, logic for accessing the instructions in sequence, logic for determining for each instruction a function to be performed and an effective address thereof, and logic for executing each instruction, the improvement wherein:
   (a) the logic for executing instructions comprises:
      a plurality of individual elements on a common support substrate optimized to perform certain logical sequences employed in executing instructions; and
   (b) the computer comprises:
      element selection logic means connected to the logic determining the function to be performed for each instruction for determining a class of each function and for causing the instruction to be executed by those of said elements which perform those of said logical sequences affecting the instruction execution in an optimum manner.

2. The improvement to a computer of claim 1 wherein:
   said element selection logic means includes means for accepting dynamic inputs designating changes in an operating environment of the computer and means for changing the ones of said elements which execute each instruction as a function of said dynamic inputs whereby instruction execution is affected in an optimum manner for the present dynamic conditions.

3. The improvement to a computer of claim 1 wherein:
   said elements comprise individual arithmetic and logic units contained on a single central processor unit chip.

4. The improvement to a computer of claim 1 wherein:
   said elements comprise individual reduced instruction set computers contained on a single central processor unit chip.

5. The improvement to a computer of claim 1 wherein:
   said element selection logic means portion for causing the instruction to be executed by those of said elements which perform those of said logical sequences affecting the instruction execution in an optimum manner includes means for transmitting and switching signals to said elements optically.

6. The improvement to a computer of claim 5 wherein said means for transmitting and switching signals to said elements optically comprises:
   a) a holographic optical element including a holographic reflective surface mounted adjacent and parallel to said common support substrate;
   b) a plurality of light source means carried by said common support substrate for directing signal-modified light beams towards said holographic reflective surface to be reflected thereby back towards said common support substrate; and,
   c) a plurality of light detecting means carried by said common support substrate and operably connected to respective ones of said elements to provide electrical signals thereto for detecting selected ones of said light beams as reflected by said holographic reflective surface and for providing associated electrical signals derived from said reflected light beams to said elements.

7. The improvement to a computer of claim 6 and additionally comprising:

means for individually and selectively switching said light source means on and off to determine which ones of said light detecting means receive said reflected light beams whereby the sequence of said elements receiving and processing said signals is determined.

8. The improvement to a computer of claim 6 and additionally comprising:

light modulation means disposed between said light source means and said light detecting means for individually and selectively blocking and passing said light beams whereby the sequence of said elements receiving and processing said signals is determined.

9. The improvement to a computer of claim 8 wherein:

said light modulation means is disposed adjacent said reflective surface of said holographic optical element.

10. The improvement to a computer of claim 5 wherein said means for optically transmitting and switching signals to said elements comprises:

a) a reconfigurable holographic optical element device including a holographic reflective surface mounted adjacent and parallel to said common support substrate and including light modulation means disposed adjacent said holographic reflective surface for selectively blocking and passing light beams from reflecting from said holographic reflective surface at individual pixel positions thereof;

b) a plurality of light source means carried by said common support substrate for directing signal-modified light beams towards said holographic reflective surface to be reflected thereby back towards said common support substrate;

c) a plurality of light detecting means carried by said common support substrate and operably connected to respective ones of said elements to provide electrical signals thereto for detecting selected ones of said light beams as reflected by said holographic reflective surface and for providing associated electrical signals derived from said reflected light beams to said elements; and, d) means for switching said light modulation means on and off at said individual pixel positions thereof to determine which ones of said light detecting means receive said reflected light beams whereby the sequence of said elements receiving and processing said signals is determined.

11. In a computer including a memory for holding a sequence of instructions to be executed, logic for accessing the instructions in sequence, logic for determining for each instruction a function to be performed and an effective address thereof, and logic for executing each instruction, a method of operation by said computer, wherein said logic for executing each instruction comprises a plurality of individual elements on a common support substrate with each element optimized to perform certain logical sequences employed in executing instructions, said method comprising for each instruction the steps of:

(a) determining the function to be performed;
(b) determining a class of each function;
(c) causing the instruction to be executed by those elements which perform the associated logical sequences affecting the instruction execution in an optimum manner.

12. The method of claim 11 and additionally comprising the steps of:

a) accepting dynamic inputs designating changes in an operating environment of the computer; and, b) changing the ones of the elements which execute each instruction as a function of the dynamic inputs whereby instruction execution is affected in an optimum manner for the present dynamic conditions.

13. The method of claim 11 wherein said step of causing the instruction to be executed by the elements which perform the associated logical sequences affecting the instruction execution in an optimum manner includes the step of:

optically transmitting and switching signals to the elements.

14. The method of claim 13 wherein said step of optically transmitting and switching signals to the elements comprises the steps of:

a) disposing a holographic optical element including a holographic reflective surface adjacent and parallel to the common support substrate;

b) disposing a plurality of light sources on the common support substrate for directing signal-modified light beams towards the holographic reflective surface to be reflected thereby back towards the common support substrate;

c) disposing a plurality of light detectors on the common support substrate and operably connecting them to respective ones of the elements to provide electrical signals thereto;

d) selectively switching the light sources on and off to determine which ones of the light detector receive the reflected light beams; and, e) detecting selected ones of the light beams as reflected by the holographic reflective surface and providing associated electrical signals derived from the reflected light beams whereby the sequence of the elements receiving and processing the signals is determined.

15. The method of claim 13 wherein said step of transmitting and switching signals to the elements optically comprises the steps of:

a) disposing a reconfigurable holographic optical element including a holographic reflective surface and light modulation means adjacent the holographic reflective surface for selectively blocking and passing light beams from reflecting from the holographic reflective surface at individual pixel positions thereof adjacent and parallel to the common support substrate;

b) disposing a plurality of light sources on the common support substrate for directing signal-modified light beams towards the holographic reflective surface to be reflected thereby back towards the common support substrate;

c) disposing a plurality of light detectors on the common support substrate and operably connecting them to respective ones of the elements to provide electrical signals thereto;

d) selectively switching the light modulation means on and off at the individual pixel positions thereof to determine which ones of the light detecting means receive the reflected light beams; and, e) detecting selected ones of the light beams as reflected by the holographic reflective surface and providing associated electrical signals derived from the reflected light beams to the associated elements whereby the sequence of the elements receiving and processing the signals is determined.

16. A computer comprising:
 (a) a memory for holding a sequence of instructions to be executed;
 (b) logic for accessing said instructions in sequence;
 (c) logic for determining for each said instruction a function to be performed and an effective address thereof;
 (d) a plurality of individual elements on a common support substrate optimized to perform certain logical sequences employed in executing said instructions; and,
 (e) element selection logic means connected to said logic determining the function to be performed for each said instruction for determining a class of each function and for causing the instruction to be executed by those of said elements which perform those of said logical sequences affecting the instruction execution in an optimum manner.

17. The computer of claim 16 wherein:
 said element selection logic means includes means for accepting dynamic inputs designating changes in an operating environment of the computer and means for changing the ones of said elements which execute each instruction as a function of said dynamic inputs whereby instruction execution is affected in an optimum manner for the present dynamic conditions.

18. The computer of claim 16 wherein:
 said elements comprise individual arithmetic and logic units contained on a single central processor unit chip.

19. The computer of claim 16 wherein:
 said elements comprise individual reduced instruction set computers contained on a single central processor unit chip.

20. The computer of claim 16 wherein:
 said element selection logic means portion for causing the instruction to be executed by those of said elements which perform those of said logical sequences affecting the instruction execution in an optimum manner including means for transmitting and switching signals to said elements optically.

21. The computer of claim 20 wherein said means for transmitting and switching signals to said elements optically comprises:
 a) a holographic optical element including a holographic reflective surface mounted adjacent and parallel to said common support substrate;
 b) a plurality of light source means carried by said common support substrate for directing signal-modified light beams towards said holographic reflective surface to be reflected thereby back towards said common support substrate; and,
 c) a plurality of light detecting means carried by said common support substrate and operably connected to respective ones of said elements to provide electrical signals thereto for detecting selected ones of said light beams as reflected by said holographic reflective surface and providing associated electrical signals derived from said reflected light beams.

22. The computer of claim 21 and additionally comprising:
 means for switching said light source means on and off to determine which ones of said light detecting means receive said reflected light beams whereby the sequence of said elements receiving and processing said signals is determined.

23. The computer of claim 21 and additionally comprising:
 light modulation means disposed between said light source means and said light detecting means selectively blocking and passing said light beams whereby the sequence of said elements receiving and processing said signals is determined.

24. The computer of claim 23 wherein:
 said light modulation means is disposed adjacent said reflective surface of said holographic optical element.

25. The computer of claim 20 wherein said means for transmitting and switching signals to said elements optically comprises:
 a) a reconfigurable holographic optical element including a holographic reflective surface mounted adjacent and parallel to said common support substrate and light modulation means disposed adjacent said holographic reflective surface for selectively blocking and passing light beams from reflecting from said holographic reflective surface at individual pixel positions thereof;
 b) a plurality of light source means carried by said common support substrate for directing signal-modified light beams towards said holographic reflective surface to be reflected thereby back towards said common support substrate;
 c) a plurality of light detecting means carried by said common support substrate and operably connected to respective ones of said elements to provide electrical signals thereto for detecting selected ones of said light beams as reflected by said holographic reflective surface and providing associated electrical signals derived from said reflected light beams to said elements; and,
 d) means for switching said light modulation means on and off at said individual pixel positions thereof to determine which ones of said light detecting means receive said reflected light beams whereby the sequence of said elements receiving and processing said signals is determined.

26. An optically intraconnected computer comprising:
 a) a memory for holding a sequence of instructions to be executed;
 b) logic for accessing said instructions in sequence;
 c) logic for determining for each said instruction the function to be performed and the effective address thereof;
 d) a plurality of individual elements on a common support substrate optimized to perform certain logical sequences employed in executing said instructions; and,
 e) element selection logic means connected to said logic determining the function to be performed for each said instruction for determining the class of each function and for causing the instruction to be executed by those said elements which perform those associated said logical sequences affecting the instruction execution in an optimum manner, said element selection logic means including means for transmitting and switching signals to said elements optically comprising, e1) a holographic optical element including a holographic reflective surface mounted adjacent and parallel to said common support substrate;

e2) a plurality of light source means carried by said common support substrate for directing signal-modified light beams towards said holographic reflective surface to be reflected thereby back towards said common support substrate; and, e3) a plurality of light detecting means carried by said common support substrate and operably connected to respective ones of said elements to provide electrical signals thereto for detecting selected ones of said light beams as reflected by said holographic reflective surface and providing associated electrical signals derived from said reflected light beams to said elements.

27. The optically intraconnected computer of claim 26 wherein:

said element selection logic means additionally includes means for accepting dynamic inputs designating changes in the operating environment of the optically intraconnected computer and means for changing the ones of said elements which execute each instruction whereby instruction execution is affected in an optimum manner for the present dynamic conditions.

28. The optically intraconnected computer of claim 26 wherein:

said elements comprise individual arithmetic and logic units contained on a single central processor unit chip.

29. The optically intraconnected computer of claim 26 wherein:

said elements comprise individual reduced instruction set computers contained on a single central processor unit chip.

30. The optically intraconnected computer of claim 26 and additionally comprising:

means for switching said light source means on and off to determine which ones of said light detecting means received said reflected light beams whereby the sequence of said elements receiving and processing said signals is determined.

31. The optically intraconnected computer of claim 26 and additionally comprising:

light modulation means disposed between said light source means and said light detecting means for selectively blocking and passing said light beams whereby the sequence of said elements receiving and processing said signals is determined.

32. The optically intraconnected computer of claim 31 wherein:

said light modulation means is disposed adjacent said reflective surface of said holographic optical element.

33. The optically intraconnected computer of claim 26 wherein:

a) said holographic optical element of said means for transmitting and switching signals to said elements optically comprises a reconfigurable holographic optical element including a holographic reflective surface mounted adjacent and parallel to said common support substrate and light modulation means disposed adjacent said holographic reflective surface for selectively blocking and passing light beams from reflecting from said holographic reflective surface at individual pixel positions thereof; and additionally comprising, b) means for switching said light modulation means on and off at said individual pixel positions thereof to determine which ones of said light detecting means receive said reflected light beams whereby the sequence of said elements receiving and processing said signals is determined.

34. In a computer including a memory for holding a sequence of instructions to be executed, logic for accessing the instructions in sequence, logic for determining for each instruction a function to be performed and an effective address thereof, and logic for executing each instruction, the improvement wherein:

a) the logic for executing instructions comprises:
a plurality of individual elements on a common support substrate optimized to perform certain logical sequences employed in executing instruction; and b) the computer comprises:
element selection logic means connected to the logic determining the function to be performed for each instruction for determining a class of each function and for causing the instruction to be executed by those of said elements which perform those of said logical sequences affecting the instruction execution in an optimum manner, said element selection logic means including means for accepting dynamic inputs designating changes in an operating environment of the computer and means for changing the ones of said elements which execute each instruction as a function of said dynamic inputs whereby instruction execution is affected in an optimum manner for the present dynamic conditions.

35. A computer comprising:

(a) a memory for holding a sequence of instructions to be executed;

(b) logic for accessing said instructions in sequence;

(c) logic for determining for each said instruction a function to be performed and an effective address thereof;

(d) a plurality of individual elements on a common support substrate optimized to perform certain logical sequences employed in executing said instructions; and, (e) element selection logic means connected to said logic determining the function to be performed for each said instruction for determining a class of each function and for causing the instruction to be executed by those said elements which perform those associated said logical sequences affecting the instruction execution in an optimum manner, said element selection logic means including means for accepting dynamic inputs designating changes in the operating environment of the computer and means for changing the ones of said elements which execute each instruction as a function of said dynamic inputs whereby instruction execution is affected in an optimum manner for the present dynamic conditions.

* * * * *

(12) EX PARTE REEXAMINATION CERTIFICATE (8202nd)
United States Patent
Bergman

(10) Number: US 5,115,497 C1
(45) Certificate Issued: May 10, 2011

(54) OPTICALLY INTRACONNECTED COMPUTER EMPLOYING DYNAMICALLY RECONFIGURABLE HOLOGRAPHIC OPTICAL ELEMENT

(75) Inventor: Larry A. Bergman, Van Nuys, CA (US)

(73) Assignee: California Institute of Technology, Pasadena, CA (US)

Reexamination Request:
No. 90/010,783, Dec. 18, 2009

Reexamination Certificate for:
Patent No.: 5,115,497
Issued: May 19, 1992
Appl. No.: 07/103,192
Filed: Oct. 1, 1987

(51) Int. Cl.
*G01S 17/00* (2006.01)
*G01S 17/88* (2006.01)
*G02B 5/32* (2006.01)
*G06E 3/00* (2006.01)

(52) U.S. Cl. ........................................... 712/200
(58) Field of Classification Search ................... 395/375
See application file for complete search history.

(56) References Cited

U.S. PATENT DOCUMENTS

| 3,470,540 A | 9/1969 | Levy |
| 4,332,008 A | 5/1982 | Shima |
| 4,514,803 A | 4/1985 | Agnew |
| 4,577,282 A | 3/1986 | Caudel et al. |
| 4,766,566 A | 8/1988 | Chuang |
| 4,942,547 A | 7/1990 | Joyce et al. |

FOREIGN PATENT DOCUMENTS

JP    0 154 051 A1    9/1985

OTHER PUBLICATIONS

Wen–mei Hwu, et al., "HPSm, a High Performance Restricted Data Flow Architecture Having Minimal Functionality," Proc. 13$^{th}$ IEEE Int'l Symposium on Computer Architecture, vol. 14, No. 2, Jun. 1986, pp. 297–306.

Charles E. McDowell, "A Simple Architecture for Low Level Parallelism," Proc. 1983, IEEE Int'l Conference on Parallel Processing, pp. 472–477.

D.W. Anderson, et al., "The IBM System/360 Model 91: Machine Philosophy and Instruction–Handling," IBM Journal of Research and Development, Jan. 1967, pp. 8–24.

S.F. Anderson, et al., "The IBM System/360 Model 91: Floating–Point Execution Unit," IBM Journal of Research and Development, Jan. 1967, pp. 34–53.

R.M. Tomasulo, "An Efficient Algorithm for Exploiting Multiple Arithmetic Units," IBM Journal of Research and Development, Jan. 1967, pp. 25–33.

J.E. Thornton, "Design of a Computer: The Control Data 6600," (published by Scott Foresman and Company, Illinois, USA, 1970).

Anis Husain, "Optical Interconnect of Digital Integrated Circuits and Systems," SPIE Proceedings, vol. 466–02, Jan. 26, 1984.

(Continued)

*Primary Examiner*—Christina Y. Leung

(57) ABSTRACT

An optically intraconnected computer and a reconfigurable holographic optical element employed therein. The basic computer comprises a memory for holding a sequence of instructions to be executed; logic for accessing the instructions in sequence; logic for determining for each the instruction the function to be performed and the effective address thereof; a plurality of individual elements on a common support substrate optimized to perform certain logical sequences employed in executing the instructions; and, element selection logic connected to the logic determining the function to be performed for each the instruction for determining the class of each function and for causing the instruction to be executed by those the elements which perform those associated the logical sequences affecting the instruction execution in an optimum manner. In the optically intraconnected version, the element selection logic is adapted for transmitting and switching signals to the elements optically.

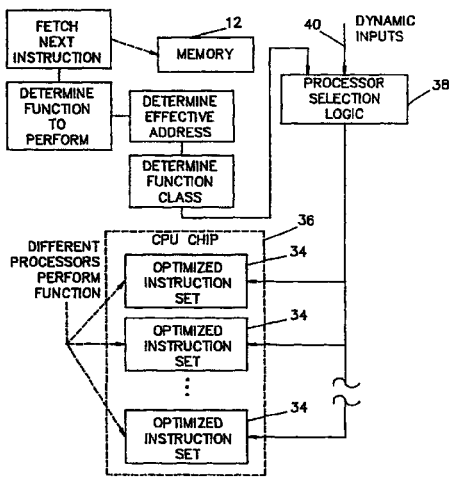

OTHER PUBLICATIONS

P. S. Ho, "Some basic problems in VLSI interconnect," Third Int'l Symposium on Very Large Scale Integration Science and Technology, eds. W. M. Bullis and S. Broydo, Proceedings vol. 85–5, the Electrochemical Society, Pennington, NJ, May 1985, p. 146.

A. S. Bergendahl, J.F. McDonald, R. H. Steinworth, and G. F. Taylor, Thick Film Stripline Micro Transmission Lines for Wafer Scale Integration, Third Int'l Symposium on Very Large Scale Integration Science and Technology, eds. W. M. Bullis and S. Broydo, Proceedings vol. 85–5, The Electrichemical Society, Pennington, NJ, May 1985, p. 175.

B. K. Gilbert and K. J. Schwab, "Will persent design approaches fulfill performance requirements for high clock rate digital signal processors based on GaAs?," SPIE Proceedings 466–01, Jan. 26, 1984.

J. W. Goodman, F. I. Leonberger, S. Y. Kung, and R. A. Athale, "Optical Interconnections for VLSI Systems," Proceedings of IEEE, 72, 850 (1984).

Raymond K. Kostuk, Joseph W. Goodman, and Lambertus Hesselink, "Optical Imaging applied to microelectronic chip–to–chip interconnections," Appl. Opt. 24, 2851 (1985).

Ravinder K. Jain, "Switching Characteristics of Logic Gates Addressed by Picosecond Light Pulses," IEEE Journal Quantum Electr, QE–19, 658 (1983).

F. J. Henley, "Functional Testing and Failure Analysis of VLSI Using a Laser Probe," Proceedings of Custom Integrated Circuits Conference, May 1984.

S. H. Lee and J. Leger, "Signal Processing Using Hybrid System," Ch. 4 in Application of Optical Fourier Transforms, Ed. H. Stark, Academic Press (1982).

N. C. Gallagher, Jr., J. C. Augus, F. E. Caffield, R. V. Edwards, J. A. Mann, Jr., "Binary Phase Digital Reflection Holograms: Fabrication and Potential Applications," Applied Optics, vol. 16, p. 413, 1977.

M. G. Buehler, B. T. Moore, and R. H. Nixon, "Parameter Extraction from Spaceborne MOSFETS," IEEE Trans. on Nucl. Sci., Dec. 1985.

L. A. Bergman, et al., "Implementation of Optical Interconnections for VLSI," as reprinted from "IEEE Transactions on Electron Devices", vol. ED–34, No. 3, (Mar. 1987).

L. A. Bergman, et al., "Applications and Design Considerations for Optical Interconnects in VLSI", as reprinted from "SPIE vol. 625–Optical Computing," 117–126 (1986).

IBM Corporation, "IBM System/360 Principles of Operation," Form A22–6821–1, File No. S360–01, IBM Systems Reference Library, Jun. 1964 (see especially pp. 10 & 62).

John L. Hennessy and David A. Patterson, "Computer Architecture: A Quantitative Approach, 3rd Edition," Morgan Kaufmann, May 31, 2002, pp. 92–95.

Honeywell, "Level 6 Minicomputer Systems Handbook," Series 60, Level 6, Oct. 1978.

Ramon Acosta, et al., "An Instruction Issuing Approach to Enhancing Performance in Multiple Functional Unit Processors," IEEE Transactions on Computers, vol. C–35, No. 9, pp. 815–828, Sep. 1986.

Paterson, David A., Communications of the ACM, v.28, No. 1,pp. 1–21, Jan. 1985.

Hennessy, John L., IEEE Transactions on Computers, v. C–35, No. 12, pp. 1221–1246, Dec. 1984.

A Dictionary of Data Processing and Computer Terms, Macdonald & Evans Ltd. 1982.

Radio Shack Dictionary of Electronic Terms with Illustrations, Mater Publishing, Inc. 1984.

IEEE Standard Glossary of Software Engineering Terminology, 1983.

Siewiorek, Daniel P., Computer Structures: Principles and Examples, McGraww–Hill Book Co., 1982, pp. 4–8, 581–586.

Ciarcia, Steve, Build Your Own Z80 Compter: Design Guidelines and Application Notes, Byte Books, 1981.

Lorin, Harold, Introduction to Computer Architecture and Organization, John Wiley & Sons, 1982. pp. 299–301.

Cooke, P., Journal of Medical Engineering & Tech., v.7, No. 6, pp. 296–299, Nov./Dec. 1983.

Dobberpuhl, Daniel W., Microvax It System, Digital Tech. Journal of Digital Equipment Corp., No. 2, pp. 12–23, Mar. 1986.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4, 11, 12, 16-19, 34 and 35 is confirmed.

Claims 5-10, 13-15 and 20-33 were not reexamined.

* * * * *